July 14, 1970

E. H. SAVELA 3,520,461

DRIVING DEVICE FOR A SERIES OF ROLLERS

Filed Feb. 7, 1968

INVENTOR.
EDWARD H. SAVELA
BY
Carlsen, Carlsen, Sturm & Wickes
ATTORNEYS

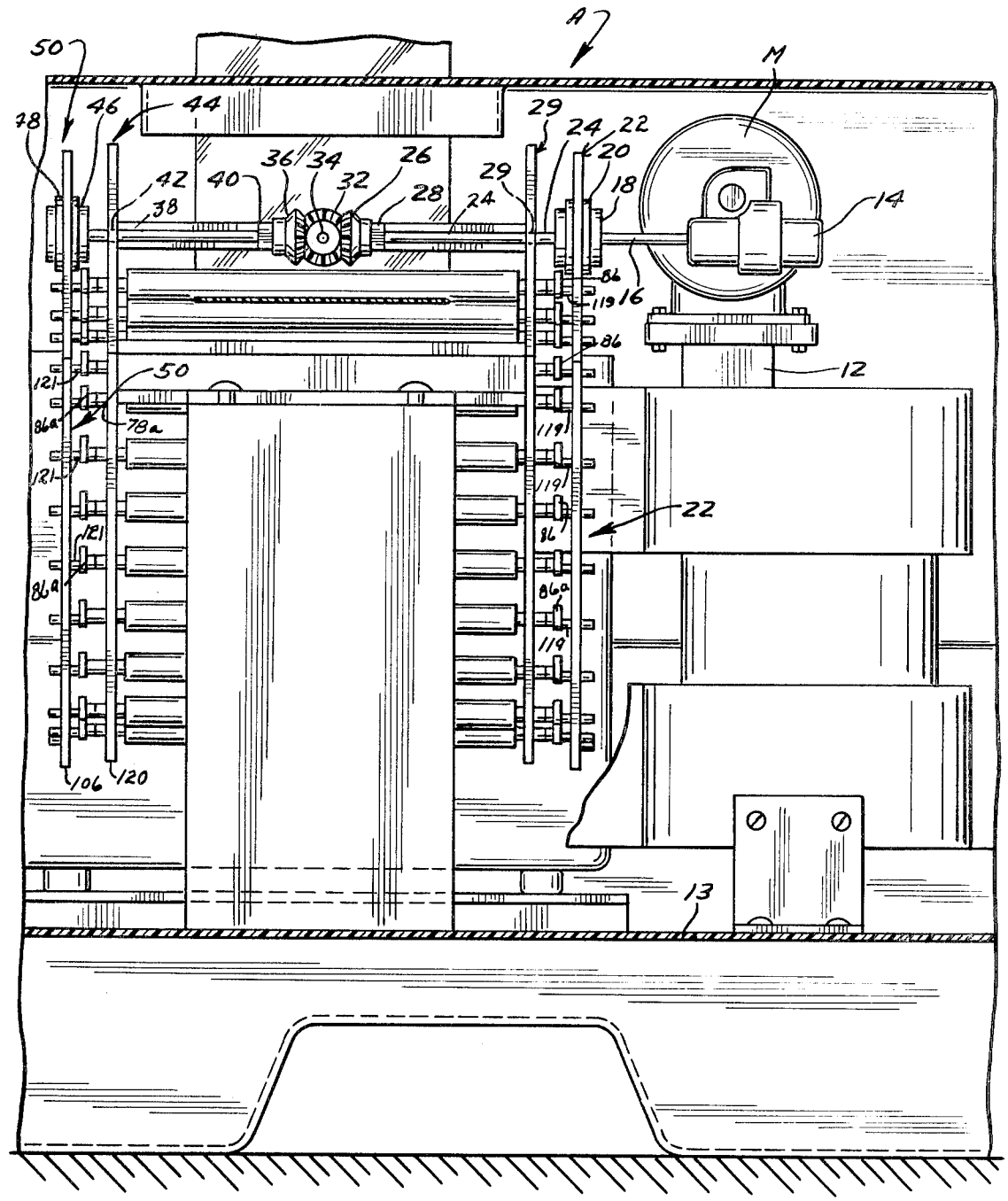

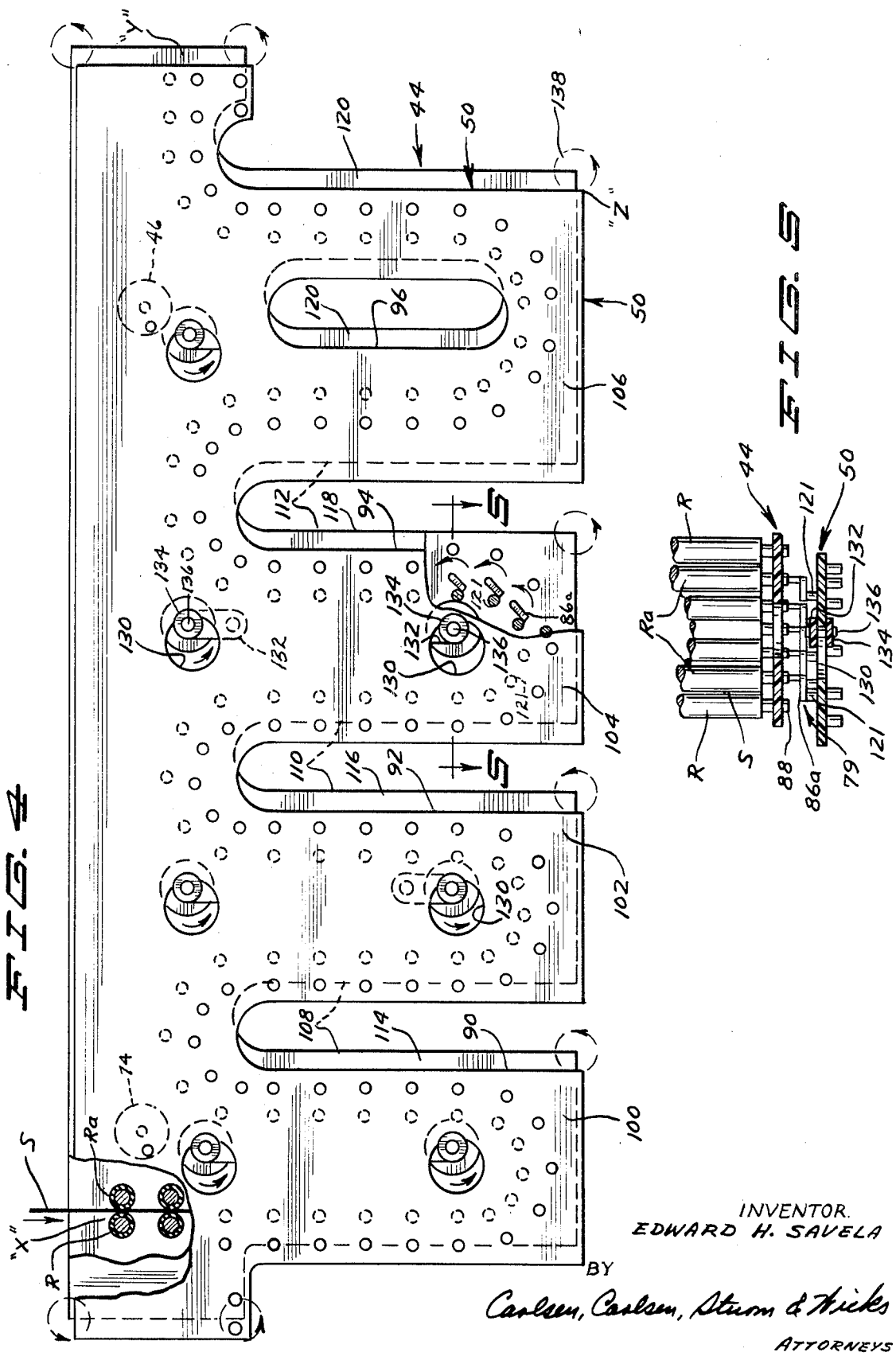

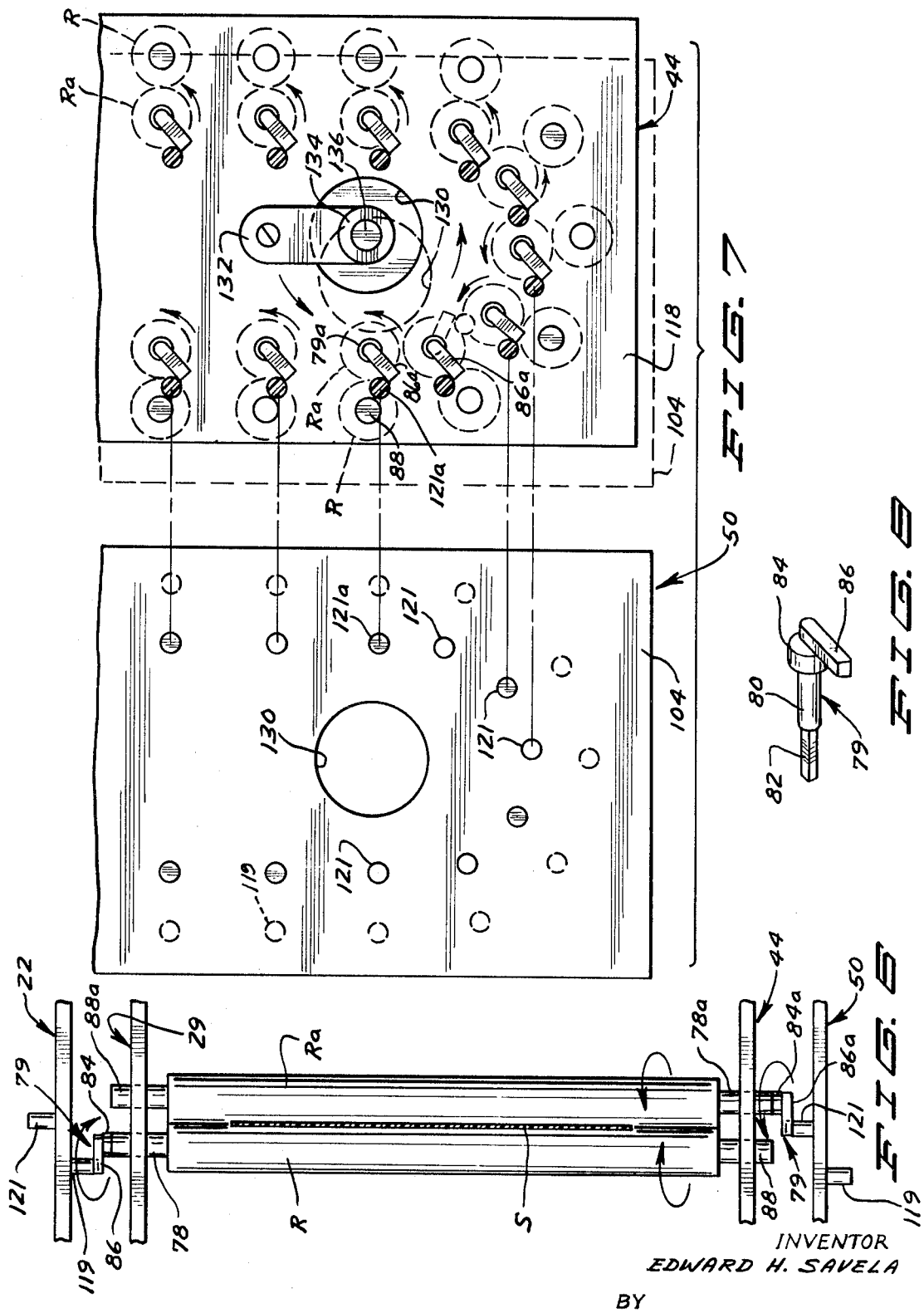

United States Patent Office 3,520,461
Patented July 14, 1970

3,520,461
DRIVING DEVICE FOR A SERIES OF ROLLERS
Edward H. Savela, Golden Valley, Minn., assignor to Pako Corporation, Minneapolis, Minn., a corporation of Minnesota
Filed Feb. 7, 1968, Ser. No. 703,576
Int. Cl. B65h 17/20
U.S. Cl. 226—188
9 Claims

ABSTRACT OF THE DISCLOSURE

The disclosure relates to driving means for a series of rollers for transporting sheet material therebetween such as photographic film and includes a supporting structure on which is mounted a pair of spaced bearing plates. The bearing plates have a series of rollers rotatably mounted thereon and a drive plate is mounted adjacent each of the bearing plates. Eccentric means is provided for operating the drive plates in a rectilinear and rotary movement, the drive plates carrying motion transmitting pins for rotating the rollers through a crank arm on each of the rollers.

SUMMARY OF THE INVENTION

In photo film processing machines, driers, developers and the like wherein a series of contact rollers transport the film therebetween, gear trains and chains drive the rollers. This necessitates numerous meshing gears and with numerous gears and journals the same must be manufactured with close tolerances to give proper alignment which also complicates assembly of the rollers and gears and increases costs. To get away from driving the rollers by gear chains the subject invention was devised. It is an object of the invention to provide a driving means for a series of rollers including a drive plate which is operated in a rectilinear and rotary movement by eccentric drive means. It is a further object to provide bearing means for rotatably supporting pairs of rollers, with the journals of the rollers adjacent the drive plate. It is also an object to provide motion transmitting means on the drive plate in the form of parts which engage crank arms formed on the journals of the rollers whereby the operation of the eccentric drive means causes the pins to rotate the rollers through the crank arms. With the above there is no need for gear drives and therefore no need for extremely close tolerances in bearings, journals and drive gears.

These and other more detailed and specific objects will be disclosed in the course of the following specification, reference being had to the accompanying drawings, in which—

FIG. 3 is an end view on the line 3—3 of FIG. 2.

FIG. 4 is a longitudinal side view of an orbital drive plate and companion bearing plate removed from the unit, portions thereof being broken away.

FIG. 5 is a sectional view on the line 5—5 of FIG. 4.

FIG. 6 is a top plan view of a pair of driven rollers showing a portion of the orbital drive plates and bearing plates therefor.

FIG. 7 is a side elevation of one segment of the orbital drive plate and bearing plate, the orbital plate segment being rotated 180 degrees to a position alongside the bearing plate segment and showing the inner face of the orbital plate segment with the outer face of the bearing plate exposed.

FIG. 8 is an enlarged perspective view of a crank pin removed from a roller.

Figure 1:
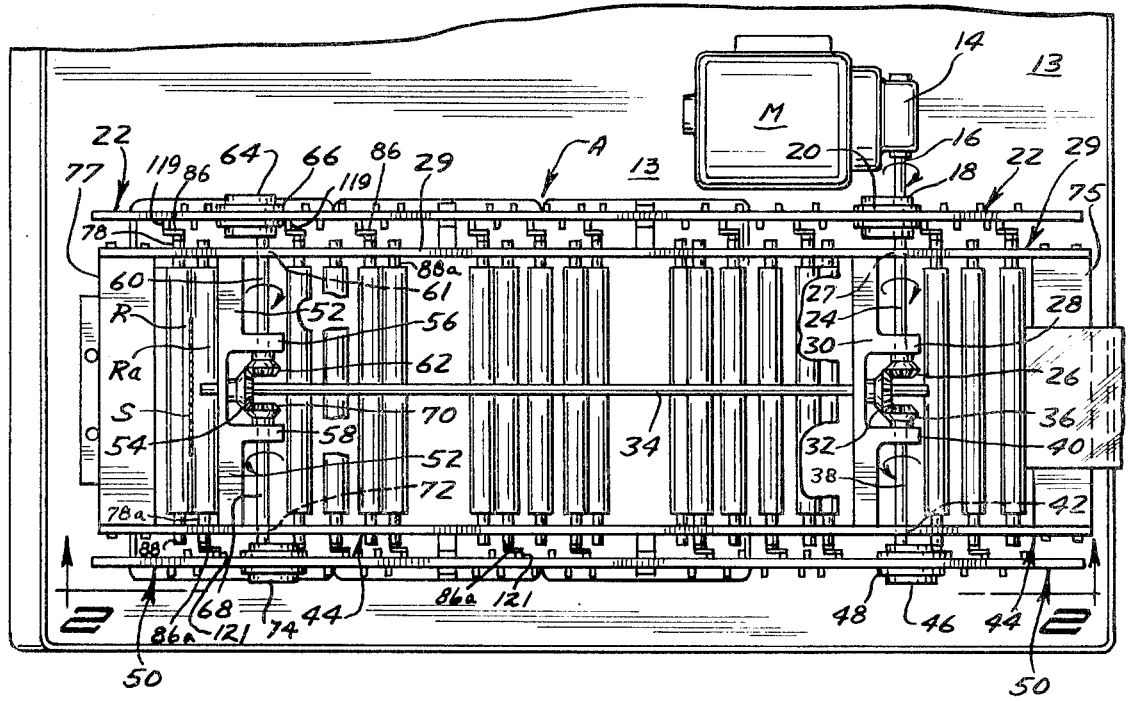
FIG. 1 is a top plan view of the multiple drive roller unit embodying the invention.
Figure 2:
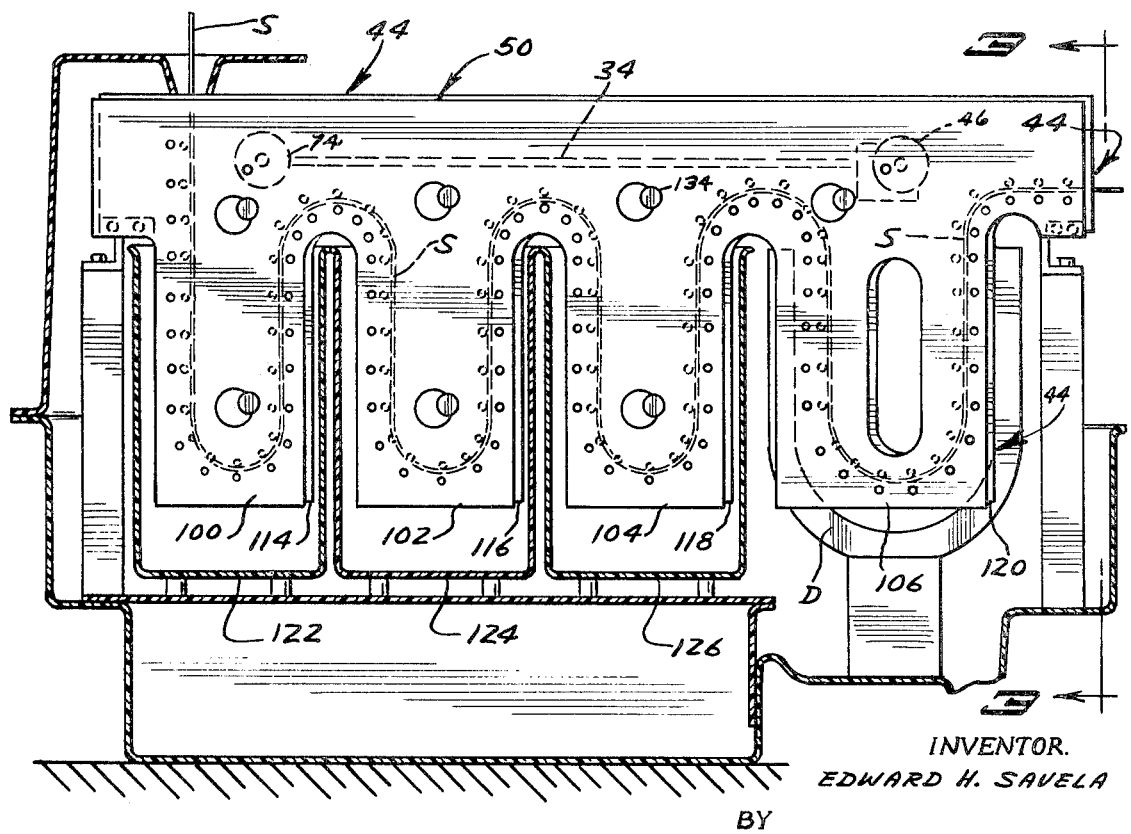
FIG. 2 is a view on the line 2—2 of FIG. 1 with tanks illustrated in position.

Referring to the drawings in detail, the roller driving mechanism A includes the motor support 12 on which is mounted the electric motor M. The motor support 12 is mounted on the supporting structure 13. Connected to the shaft of the motor M is the conventional gear reduction box 14 from which extends the stub shaft 16. The shaft 16 is secured at its outer end to a first cylindrical eccentric 18 which is rotatably mounted in the ring 20 securely mounted in an opening formed in a first orbital drive plate 22, hereinafter described. A first transverse drive shaft 24 is connected at its outer end to the eccentric 18 in line with shaft 16 and at its inner end to a first bevel gear 26, the shaft 24 rotatable in the bearing block 28 formed on the transverse support 30. The shaft 24 extends through an opening 27 formed in a first bearing plate 29 hereinafter described. The gear 26 engages a second bevel gear 32 secured to one end of the longitudinal drive shaft 34 rotatable at one end in a first transverse support 30. The gear 32 engages a third bevel gear 36 secured to the inner end of the second transverse drive shaft 38 rotatably mounted in the bearing block 40 formed on the transverse support 30 and spaced from block 28. The shaft 38 extends through an opening 42 formed in a second bearing plate 44 hereinafter described, and the outer end of the shaft 38 is connected to a second cylindrical eccentric 46 rotatably mounted in the ring 48 securely mounted in an opening formed in a second orbital drive plate 50 hereinafter described.

The opposite end of the longitudinal drive shaft 34 is rotatably mounted in a second transverse support 52 connected to the bearing plates 29 and 44, and secured to the shaft 34 is the bevel gear 54. Extending from the support 52 are the spaced bearing blocks 56 and 58. Further provided is a third transverse drive shaft 60 journaled at the inner end in the bearing block 56 and at the outer end in the hole 61 of bearing plate 29. Secured to the inner end of the shaft 60 is the bevel gear 62 which meshes with the gear 54, and secured to the outer end of the shaft 60 is a third cylindrical eccentric 64 which is rotatably mounted in the ring 66 securely mounted in an opening formed in the first orbital plate 22.

The numeral 68 designates a fourth transverse drive shaft rotatably mounted at the inner end thereof in the block 58, and secured to the inner end of the shaft 68 is the bevel gear 70 which meshes with gear 54. The outer end of the shaft 68 is rotatably mounted in an opening 72 formed in the bearing plate 44, and the outer end of shaft 68 is connected to the fourth cylindrical eccentric 74 rotatably mounted in the ring 76 securely mounted in an opening formed in the second orbital plate 50. Thus, with the motor M in operation the transverse drive shafts 24 and 60 both rotate in the same direction as indicated by the arrows in FIG. 1, and the transverse drive shafts 38 and 68 both rotate in the same direction but in reverse or opposite to that of the shafts 24 and 60. The shafts 24 and 60 through the eccentrics 18 and 46 rotate any point on the orbital drive plate 22 through a perfect circular orbit in a single plane, and the shafts 38 and 68 through the eccentrics 46 and 74 rotate any point on the orbital drive plate 50 through a perfect circular orbit in a single plane but in the opposite or reversed direction. Briefly, each of the drive plates 22 and 50 is operated in rectilinear and rotary movement and the drive plate 22 is supported on eccentrics 18 and 64 with drive plate 50 supported on eccentrics 46 and 74. The eccentrics 18 and 64 have parallel axis, and the eccentrics 46 and 74 have parallel axis.

The bearing plate 29 and the bearing plate 44 are secured to the supports 75 and 77 and rotatably mount a multiplicity of pairs of rollers R and Ra (particularly FIG. 6). Each roller R has formed on one end thereof the journal 78 which is journaled in the bearing plate 29 and extends outwardly beyond the plate. Further provided is the crank member 79 which includes the shaft portion 80, the squared inner end 82, the circular end flange 84 and the crank arm 86. The crank arm 86 extends on a radius of the flange 84 and is normal to the common longitudinal axis of the end 82, the shaft portion 80 and the circular flange 84. The shaft portion 80 is mounted in journal 78 and the squared end 82 is secured within the roller R with the cam follower in the form of crank arm 86 extending normal to the axis of the roller R. The other end of the roller R has extending therefrom the journal 88 which is rotatably mounted in the bearing plate 44. The roller Ra is identical to roller R, the identical portions bearing identical numbers but accompanied by a lower case a, but roller Ra is reversed whereby the journal 88 as 88a is rotatably mounted in bearing plate 29 instead of bearing plate 44, particularly FIG. 6. As will be seen the rollers R and Ra are driven in opposite directions, and the same is necessary for the rollers to pass and transport sheet material S between the same. The rollers R and Ra are so positioned that the same have linear contact for transporting sheet material, such as S, therebetween.

The orbital plate 50 is formed with the spaced openings 90, 92, 94, which form the spaced orbital plate segments 100, 102, 104, and 106. The segment 106 is formed with opening 96. The orbital plate 22 is similarly formed. The bearing plate 44 which is a companion to orbital plate 50 is formed with spaced openings 108, 110, and 112 which form the spaced bearing plate segments 114, 116, 118 and 120. The segments 114, 116, 118 and 120 of plate 44 are in substantially transverse opposed alignment with segments 100, 102, 104 and 106, respectively, of plate 50 (particularly FIG. 4). The orbital drive plate 22 is substantially identical to orbital plate 50 except on a left and right basis, and the bearing plates 29 and 44 are identical.

The various pairs and banks of rollers R and Ra are driven by substantially identical structure in a substantially identical manner, and for the purpose of describing the invention it is sufficient to describe in detail the rollers R and Ra and driving structure, for example, particularly illustrated in FIGS. 4–8. FIG. 7 is to be identified with FIG. 4 showing segment 104 of orbital drive plate 50 and companion segment 118 of bearing plate 112. In FIG. 7 segment 104 is rotated 180 degrees from companion segment 118. On the inner face surface of orbital drive plate 50 are secured a multiplicity of short spaced cylindrical cam parts in the form of drive pins 121 extending inwardly from the plate 104 in the pattern shown. The pattern of pins on the inner surface of drive plate 22 is similarly formed but offset from the pins of plate 50, for the end of the other roller is driven. The pins 121 are motion transmitting parts.

For purposes of explanation particular reference is made to FIG. 7 wherein one of the identical drive pins is numbered 121a and one of the identical crank members 79 is numbered 79a which has crank arm 86a. The crank member 79a is mounted on roller Ra. It will be seen that as orbital plate segment 104 is orbitally rotated 360 degrees as hereinbefore described, the driving pin 121a, mounted on plate segment 104, bears continuously against and slides on the crank arm 86a and rotates the arm 360 degrees thereby rotating the roller Ra on which the crank member 79a is secured. Roller R which is journaled at one end in bearing plate segment 118 is rotated at its opposite end by means of the crank member 79 mounted thereon and actuated by a drive pin such as pin 119 mounted on the inner surface of orbital plate 22 in the same manner as a drive pin 121 on the inner surface of orbital plate 50 above described.

It will be seen that the drive plates 22 and 50 are substantially identical, plate 50 having pins 121 formed on the inner surface thereof as explained heretofore and pins 119 on the outer surface thereof. If plate 50 is put in the position of plate 22 it will be seen that pins 119 do the driving in that instance of rollers R, see FIG. 6 in particular, and pins 121 are outwardly of the plate. With reference to FIGS. 6 and 7, the pins 121 of plate 50 drive rollers Ra at one end while the pins 119 of plate 22 are utilized to drive rollers R at the other end. The similarity of plates 22 and 50 and the pattern of pins thereon will be seen particularly in FIG. 6.

As heretofore described the orbital drive plates 22 and 50 rotate in the opposite directions, and as a result it will be seen that the rollers R and Ra are driven in the opposite direction, for roller R at one end is rotated by plate 22 while roller Ra is rotated at one end opposite to that of the driven end of R by the opposed orbital plate 50. The companion rollers R and Ra must of necessity be driven in opposite directions to cause sheet material S to be moved therebetween. However, only one of the rollers R or Ra need be driven if the non-driven roller is free to rotate in the opposite direction. In driving both rollers R and Ra as compared to driving only one roller of a pair there is more positive movement of sheet material between the same and there is less vibration of the unit.

It will be noted that the disclosure herein shows a new and novel method of rotating rollers and particularly a multiplicity of pairs of rollers. The pairs of rollers R and Ra are rotatably positioned on the spaced opposed bearing plates 29 and 44 in vertical banks on the various segments 108, 110, 112 and 120 of bearing plate 44 and on companion and identical segments of an identical bearing plate 29. The various vertical opposed banks of pairs of rollers are connected by an arcuate formation of pairs of rollers at the top of the banks and an arcuate formation of pairs of rollers at the bottom of the vertical opposed banks whereby sheet material S (FIG. 4 in particular) can be deposited between a pair of rollers R and Ra as at point X of the device and be transported by means of the rollers to point Y.

The banks of rollers R and Ra rotatably mounted on segment 114 of bearing plate 44 and on an identical segment formed on bearing plate 29 extend into tank compartment 122. Also, the banks of rollers R and Ra rotatably mounted on segment 116 of bearing plate 44 and on an identical segment formed on bearing plate 29 extend into tank compartment 124, and the banks of rollers R and Ra rotatably mounted on segment 118 of bearing plate 44 and on an identical segment formed on bearing plate 29 extend into tank compartment 126. The banks of rollers R and Ra rotatably mounted on segment 120 of bearing plate 44 and a companion segment of bearing plate 29 are not in a tank but open and subject to drying mechanism indicated as D.

Each of the orbital plates 22 and 50 is formed with multiple means for guiding the same in its rotary and rectilinear movement. Inasmuch as each guide means is substantially identical only one of FIGS. 4 and 7 will be described. The orbital plate guide means includes a circular opening 130 formed in the plate. A bracket 132 is secured at one end to bearing plate 44 and on the other end of the bracket is mounted the freely rotatable and spaced disc 134 by means of the pin 136. The pin 136 extends through the opening 130 and the disc is thereby mounted outwardly of the plate and adjacent the plate. The hole 130 and bracket 132 are so positioned that as the orbital plate 50 rotates the plate 50 is continuously adjacent the disc 134 for guidance relative thereof. The orbital path of the drive plate 50 is illustrated in FIG. 4 where the corner of the plate indicated as Z scribes the path indicated by the broken circular line 138 and in the direction of the arrow. By the same token the drive pins 120 of the plate 50 travel in the same type of circular path, the plate driven in a rectilinear and rotary movement as heretofore set forth.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Driving means for a series of rollers comprising:
   (a) a supporting structure,
   (b) bearing means on said supporting structure for rotatably mounting said rollers for rotation about the axis thereof,
   (c) drive means for driving said rollers,
   (d) eccentric means engaging said drive means for operating said drive means in rectilinear and rotary movement,
   (e) means for actuating said eccentric means,
   (f) said drive means including motion transmitting means on said drive means engaging
   (g) a part on certain of said rollers eccentrically disposed relative thereto to simultaneously rotate said denoted rollers,
   (h) the eccentricity of the eccentric being equal to the eccentricity of the motion transmitting means,
   (i) said motion transmitting means of said drive means being a pin and
   (j) said part on said rollers being an arm.

2. Driving means for a series of rollers comprising:
   (a) a supporting structure,
   (b) bearing means on said supporting structure for rotatably mounting said rollers for rotation about the axis thereof,
   (c) drive means for driving said rollers,
   (d) eccentric means engaging said drive means for operating said drive means in rectilinear and rotary movement,
   (e) means for actuating said eccentric means,
   (f) said drive means including motion transmitting means on said drive means engaging
   (g) a part on certain of said rollers eccentrically disposed relative thereto to simultaneously rotate said denoted rollers,
   (h) the eccentricity of the eccentric being equal to the eccentricity of the motion transmitting means,
   (i) said motion transmitting means of said drive means being a pin and
   (j) said part on said rollers being an arm,
   (k) said pin being cylindrical and
   (l) said arm having a surface along which the pin may slide.

3. The device according to claim 2 in which the contacting surface of the arm is substantially radial with respect to the axis of the roller.

4. Driving means for a series of pairs of coacting rollers comprising:
   (a) a supporting structure,
   (b) spaced supports extending outwardly from said supporting structure,
   (c) bearings on said supports for rotatably mounting said rollers for rotation about the axis thereof,
   (d) journals at both ends of said rollers, said journals being journaled in said bearings,
   (e) driving means disposed at one end of said rollers for rotating one of the rollers of each pair, and
   (f) driving means at the other end of said rollers for rotating each of the other of said pairs of rollers in the opposite direction, and
   (g) power driven means for driving said driving means,
   (h) said supports consisting of spaced plates having bore means to form said bearings,
   (i) the driving means consisting of spaced plates having cams, and
   (j) a cam follower on one journal of one roller of each pair of rollers and disposed adjacent one of said supports,
   (k) a cam follower on one journal of the other of said rollers of each pair of rollers and disposed adjacent the other of said supports,
   (l) each of said cam followers being driven by one of said cams.

5. Driving means for a series of pairs of coacting rollers comprising:
   (a) a supporting structure,
   (b) spaced supports extending outwardly from said supporting structure,
   (c) bearings on said supports for rotatably mounting said rollers for rotation about the axis thereof,
   (d) journals at both ends of said rollers, said journals being journaled in said bearings,
   (e) driving means disposed at one end of said rollers for rotating one of the rollers of each pair, and
   (f) driving means at the other end of said rollers for rotating each of the other of said pairs of rollers in the opposite direction, and
   (g) power driven means for driving said driving means,
   (h) said power driven means including
   (i) a reverse drive driving one of said driving means in one direction and the other of said driving means in the opposite direction.

6. Driving means for a series of pairs of coacting rollers comprising:
   (a) a supporting structure,
   (b) spaced supports extending outwardly from said supporting structure,
   (c) bearings on said supports for rotatably mounting said rollers for rotation about the axis thereof,
   (d) journals at both ends of said rollers, said journals being journaled in said bearings,
   (e) driving means disposed at one end of said rollers for rotating one of the rollers of each pair, and
   (f) driving means at the other end of said rollers for rotating each of the other of said pairs of rollers in the opposite direction, and
   (g) power driven means for driving said driving means,
   (h) each driving means including a pair of spaced eccentrics with parallel axis.

7. The device according to claim 6 in which
   (a) the eccentrics at one end of each of said supports being attached to
   (b) transverse shafts extending inwardly from said eccentrics,
   (c) gears mounted on said transverse shafts,
   (d) the eccentrics at the other end of each of said supports being attached to
   (e) other inwardly extending transverse shafts spaced from the first named transverse shafts in a direction at right angles to the axes of said first named transverse shafts,
   (f) said second named transverse shafts having mounted thereon,
   (g) other gears inwardly of said eccentrics
   (h) a longitudinal shaft extending between the transverse shafts at one end of the supports and the transverse shafts at the other end of said supports,
   (i) gear means at one end of said longitudinal shaft engaging the gears mounted on the transverse shafts at one end of the supports and causing rotation in opposite directions of said eccentrics,
   (j) gear means at the other end of said longitudinal shaft engaging the gears mounted on the transverse shafts at the other end of said supports and causing similar rotation of the eccentrics at the other end of the supports and
   (k) power driven means connected to one of said shafts.

8. The device according to claim 7 in which
   (a) the transverse shafts at each end of the supports are coaxial, and
   (b) the gears and gear means are bevel gears.

9. Driving means for a series of rollers comprising:
(a) a supporting structure,
(b) bearing means including spaced plates having bore means for rotatably mounting said rollers for rotation about the axis thereof,
(c) drive means for driving said rollers including a plate,
(d) eccentric means engaging said plate for operating said plate in rectilinear and rotary movement,
(e) means for actuating said eccentric means,
(f) said plate including motion transmitting means in the form of an extension on said plate and
(g) an arm on said rollers engageable by said extension to simultaneously rotate said rollers.

References Cited

UNITED STATES PATENTS

| | | | |
|---|---|---|---|
| 438,239 | 10/1890 | Laffitte | 74—68 |
| 3,078,024 | 2/1963 | Sardeson | 226—189 X |
| 3,433,083 | 3/1969 | Pope et al. | 74—68 |

FOREIGN PATENTS

| | | |
|---|---|---|
| 905,082 | 9/1962 | Great Britain. |

ALLEN N. KNOWLES, Primary Examiner

U.S. Cl. X.R.

226—189